Dec. 1, 1970  R. MEYER  3,543,335
MOULDING PRESS
Filed July 17, 1967  3 Sheets-Sheet 3

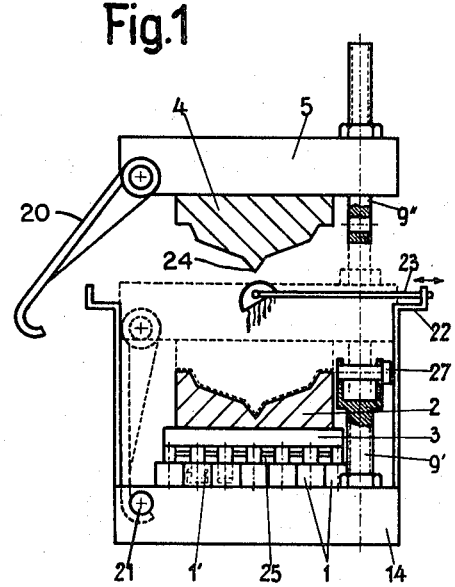
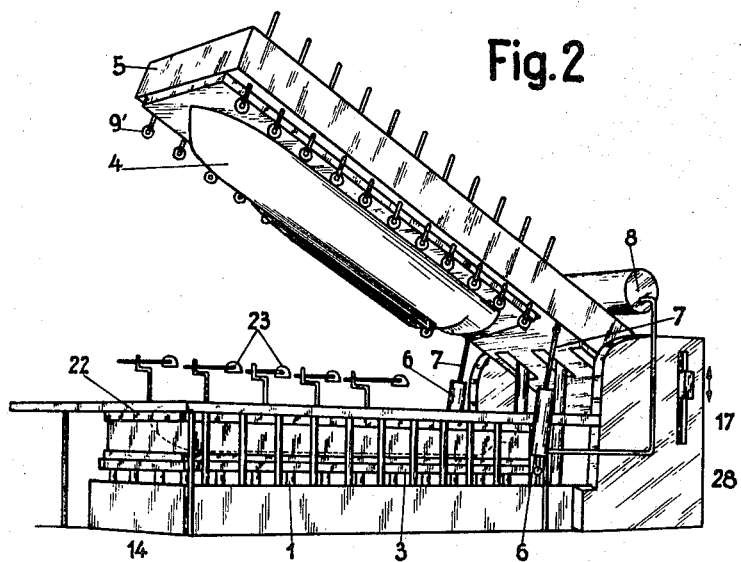

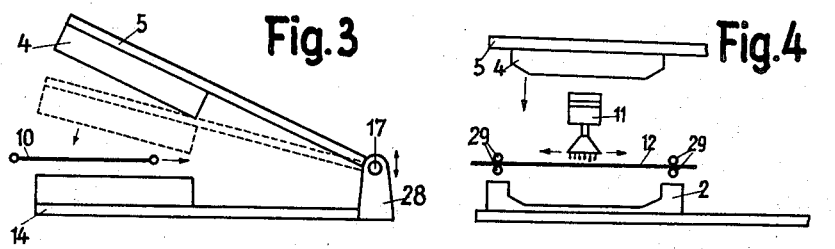
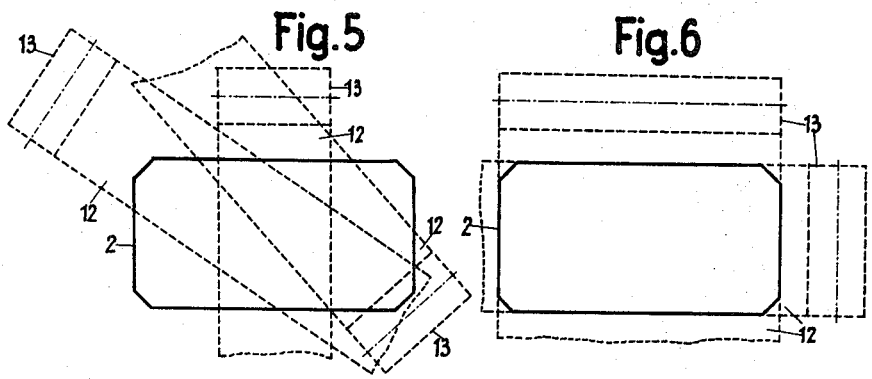
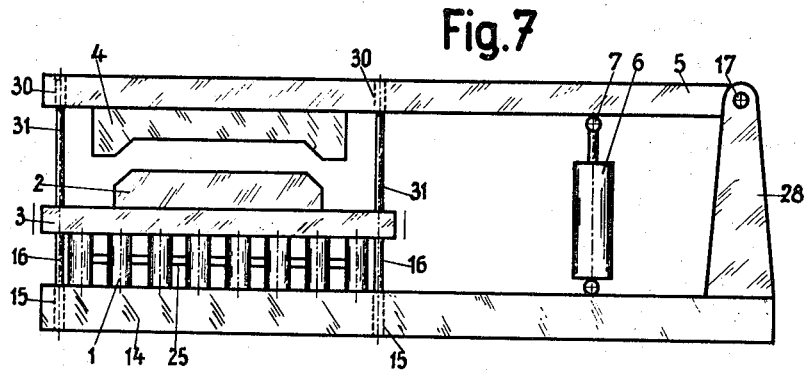
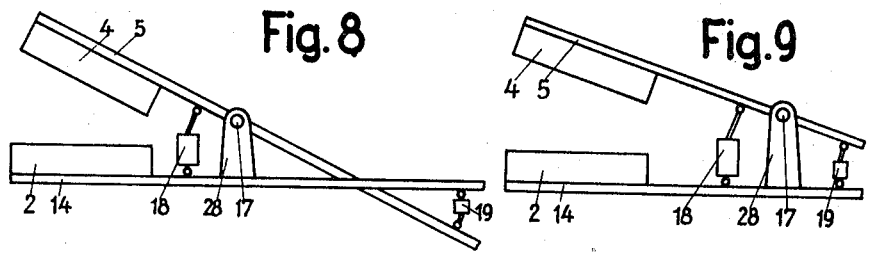

United States Patent Office 3,543,335
Patented Dec. 1, 1970

3,543,335
MOULDING PRESS
Rudolf Meyer, Chiemseestrasse 42,
Gstadt am Chiemsee, Germany
Filed July 17, 1967, Ser. No. 653,903
Int. Cl. B29c 3/00; B29g 5/00
U.S. Cl. 18—16
14 Claims

ABSTRACT OF THE DISCLOSURE

A molding press for production of articles of large area from reinforced plastic material, e.g., boat hulls, automobile-bodies, etc., have a female mold which is forced into molding engagement with a male mold by a plurality of short-stroke pressure cylinders. The male mold rotates about an axis located to the side of the press into spaced position above the female mold and is locked in such position for the molding operation. The press is free of yokes and like obstructions so the mold cavity is freely accessible for inserting materials and removing molded articles. The male mold is moved at high speed into locking position and energy of its descent may be used to actuate the locking of the male mold or perform other work involved in the press operation. The structure and operation of the press ensures that premature polymerization of plastic material and cracks in the molded articles do not occur.

---

The invention relates to a press for the production of articles of large area from hardenable, preferably reinforced plastics material, having a plurality of short-stroke moulding pressure cylinders, preferably consisting of hydraulic cylinders, which lift the female mould.

Presses for large-area articles of plastics material are already known in which relatively short-stroke moulding tools are provided, which are spread over the whole projected area. It is only possible to fabricate relatively small articles like trays, small automobile body parts and the like by means of the known presses; when large articles are fabricated by the heat moulding method—which is the only economic one—polymerisation occurs before the beginning of the moulding operation since the time required for inserting the hot article is too long.

A press has heretofore been proposed which may be provided with a different number of moulding pressure cylinders in conformity with the varying size of the moulds applied. This embodiment, too, only permits the fabrication of relatively small articles, since the path from the mould, charged outside the press, to the press itself is too long to prevent the beginning of the polymerisation. Moreover, none of the known embodiments compensates for irregularities which cannot be avoided with large articles so that bending forces can be prevented.

It is an object of the present invention to provide a press which is capable of fabricating extremely large articles like vehicle roofs, caravan components, boats and the like by means of the materials nowadays in use, and this without polymerisation of the heated material to be pressed and without damaging the structure of the article by bending stresses during the moulding operation.

Polymerisable resins have gained considerable importance due to the fact that, in combination with reinforcing materials, for example glass fibres, they may be utilized for fabricating articles the properties of which excel those of conventional materials. For this reason, a press for reinforced plastics mouldings must be provided with independently accessible moulds without any columns, yokes, traverses obstructing the charging or cleaning operations and the removal of the formed article.

If one mould is to be inserted into the moulding materials, the speed of approach preferably given by the energy of fall of the main head of the press is to be reduced to approximately 2 cm./sec. in order to prevent the material from spilling over and any reinforcement inserted into the mould from being displaced. The opening of the mould takes place at the same speeds, but in inverse order.

According to the invention idling is separated from real moulding; the main head is provided with locking elements disengageable from the male mould, which hold the two moulds together before the actual moulding operation. When the main head is lifted after the moulding operation, the locking elements disengaged from each other to not obstruct as do the columns and yokes of conventional presses during the removal, or during cleaning and charging operations.

During the moulding operation the male moulds, which is folded linearly or folded down on hinges—preferably at speed of fall—is moved towards the female mould to be locked with the latter; subsequently, the actual moulding operation follows at reduced speed.

The press according to the invention consists of moulding pressure cylinders which can be actuated individually or in groups and are rigidly connected with each other in order to preclude bending forces and to compensate for mould irregularities; the main head locked with the platen supporting the female mould during the moulding operation and containing the male mould, can be moved at high speed towards the female mould, when the mould is closed, and can be lifted or pivoted away for the purpose of removing the moulded article or for charging the mould.

An especially convenient embodiment provides a main head which is connected with the piston of at least one cylinder arranged below the latter and which is moved at the speed of fall towards the female mould, when the mould is closed, the energy of fall of the main head being transmitted to a feeding vessel by an agent contained in the cylinder(s). This energy may then be employed for holding the locking device together during the moulding operation, for lifting the main head or for other purposes. Shortly before closure of the two moulds, the cylinders brake the falling main head in such manner that the plastics material and the reinforcement may be inserted or pivoted into the latter.

A very simple embodiment of a press according to the invention consists of two, for example hingedly connected, mountings which support a male and female mould and which may be moved together until both moulds are superposed, one parallel above the other, and may be coupled by inserting one into the other or by removing the locking elements; subsequently, pressure cylinders arranged below the female mould, for example hydraulic cylinders, start the actual moulding operation.

Before closing the mould, the reinforcement consisting, for example of glass fibre mats, and the exact quantity of liquid synthetic resin required for the finished product are inserted into the mould. In order to prevent the synthetic resin from hardening too quickly, especially in heated moulds, the mould has to be closed and pressurized in a few seconds. According to the invention the quick closure of the moulds is obtained by moving the main head towards the female mould at the speed of fall.

It is especially convenient to introduce the synthetic resin shortly before the beginning of the actual moulding operation, i.e. after the start of the closing movement of the two moulds. Injection jets for the synthetic resin are controlled in synchronism with the closing movement of the main head and move out of the moulding device, when the brake devices slow down the falling movement of the main head. Thus the time between the insertion of the synthetic resin into the mould and the press-moulding is cut to a minimum.

The actual moulding operation has to take place slowly in order to prevent the synthetic resin from being spilled or the reinforcement from being displaced. In a conventional manner, it is done by means of hydraulic cylinders. By lowering the latter at the end of the moulding operation, the opening of the mould is started, the two moulds being moved apart by pivoting back the main head supporting the male mould.

Since in the construction according to the invention a plurality of relatively weak cylinders are employed, each single cylinder contributes only a small effect and each cylinder is therefore susceptible of irregularities. A possible lack of several cylinders has little influence on the efficiency of the moulding device. If female moulds smaller than the platen are employed, a certain number of cylinders may be eliminated. Some cylinders are preferably provided with differential pistons and serve as pressure elements or retracting organs.

It is suitable to employ a plurality of small cylinders instead of one big cylinder since force is regularly distributed and the mould is less strained. As the main head is rotatable about an axis outside the utilizable size of the platen, this axis is not under pressure during the moulding operation, since the moulding forces are compensated in the closed system inside the projected area. Thus it is also possible to make the pivotal axis vertically adjustable; in conformity with the height of the mould it is adjusted to the height required to bring the two moulds into a parallel position within a small distance, after the main head has been lowered.

The press according to the invention also permits the moulding of undercuts, for example the sterns of boats. The stroke of the actual moulding operation being quite short, the path of vertical movement of the female mould towards the male mould is sufficient.

The invention enables presses of a size which cannot be realized in conventional construction, to be manufactured; in conventional construction they would be too heavy and too expensive. Moreover, the speed of production of a press according to the invention is higher than that of conventional small presses.

Embodiments of the invention are hereinafter described in greater detail by way of example. In the drawings:

FIG. 1 is a section of the press represented in side view in FIG. 2,

FIG. 2 is an elevation view of the opened press of the invention,

Figure 10:
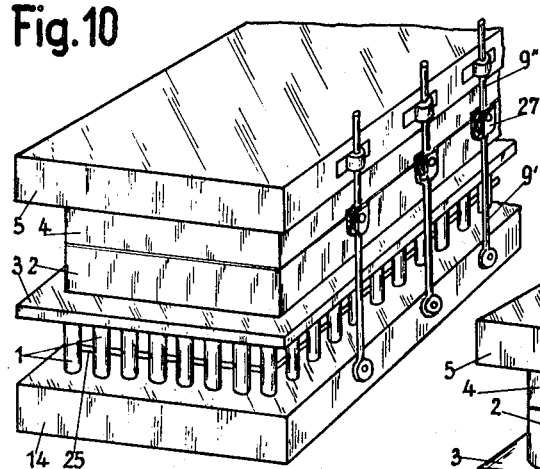
Figure 11:
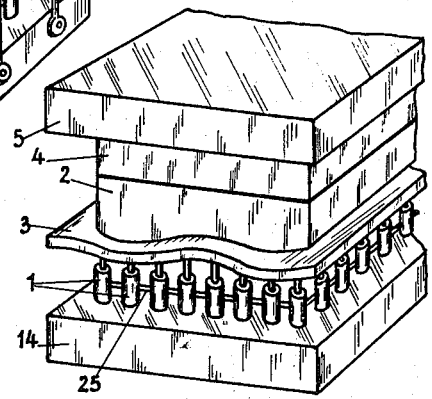
Figure 12:
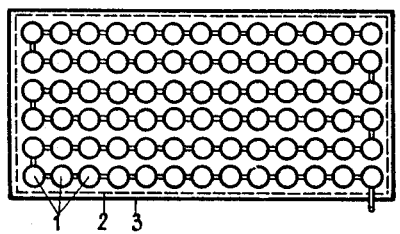
Figure 13:
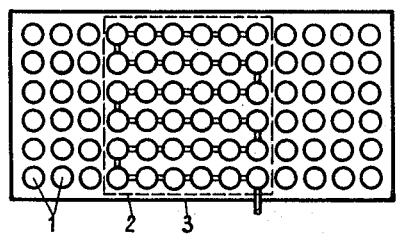
Figure 14:
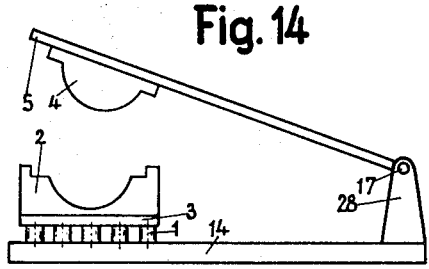
Figure 15:
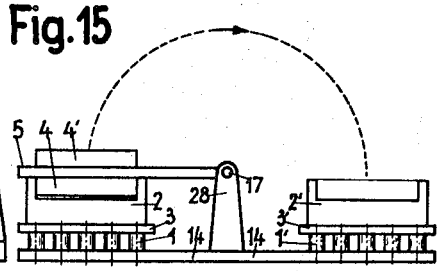

FIG. 3 is a schematic view showing how to insert the reinforcement into the mould during the falling movement of the main head, FIG. 4 shows the resin impregnation of a reinforcement independently held between the two moulds, FIGS. 5 and 6 show possible methods of inserting webs, as reinforcements, into the mould, FIG. 7 is a sectional side view of the precise positioning of the platen and main head, FIGS. 8 and 9 show possible mountings of the main head, FIG. 10 is a diagram showing the actual moulding part with the locking elements represented at the right side in FIG. 1, FIG. 11 is a side section of a press with a flexible platen adaptable to irregularities at the bottom of the mould, FIGS. 12 and 13 are a top view of the platen and of female moulds of different size, the full or partial utilization of the pressure cylinders being shown, FIG. 14 is a diagram of the main head rotatable about an axis parallel to the longitudinal extension of the press, FIG. 15 is a schematic side view of a main head which can efficiently be utilized on two sides.

The essential configuration of a press according to the invention is shown in FIGS. 1 and 2. A plurality of moulding pressure cylinders 1 are provided on a stand 14, which preferably consist of short-stroke hydraulic cylinders. They support a platen 3 which supports the female mould 2. The latter is lifted and lowered with the platen 3 by the hydraulic cylinders.

The male mould 4 which can suitably be inserted into the female mould 2, is fixed on the main head 5. According to the embodiment this is done by pivoting the main head 5 around the axis 17, which is fixed on a pedestal 28 rigidly connected with the stand 14. Without any departure from the scope of the invention, the main head 5 can also be moved towards the female mould in another way, e.g. by vertically lowering the main head 5 which is precisely above the female moulds.

By pivoting and by lowering the main head 5 the latter and the male mould 4 supported by it are brought into a position precisely parallel to the female mould 2, at a relatively small distance from the latter, in which it is fixed by locking elements. Said locking elements which replace the columns and yokes in conventional presses, may be orientable hooks 20 which are arranged on the main head 5 and engage into pegs 21 on the stand 14, or stationary annular eyebolts 9″, fixed on the main head 5, which are connected to the stand 14 by means of forked eyebolts 9′ and locking bolts 27. These locking bolts which are mechanically, pneumatically or hydraulically coupled in synchronism with the movement of the pivotable main head 5, when engaged, glide through the annular eyebolts 9″ and the forked eyebolts 9′.

Before the mould is closed, the reinforcements required, the liquid synthetic resin and the catalyzer are inserted into the female mould 2. In order to prevent the synthetic resin from hardening too soon, the latter is only inserted into the mould shortly before closing the latter. The rapid closing movement required of the main head 5 is obtained in that it moves into the locking position, when it falls. When the deepest point 24 of the male mould 4 has reached the surface of the synthetic resin, the falling movement must be finished and the locking elements must be engaged.

In order to retard the falling movement, a brake cylinder 6 having a piston 7 is provided between the main head 5 and the stand 14 the piston 7 being connected with the main head 5 and the cylinder 6 with the stand 14. The energy of fall of the main head transmits the agent in the cylinder 6 to a reservoir 8 and may be utilized to close the locking device holding the two moulds together for the ensuing moulding stroke.

After locking the main head 5 with the stand 14, the actual moulding stroke begins. By means of the hydraulic cylinders 1 aranged below the platen 3, the platen 3 and the female mould 2 fixed to it are lifted at a speed of approximately 2 cm./sec. and are moved towards the male mould 4 until the liquid synthetic resin has spread over the remaining space between the two moulds and has been pressurized. The surplus resin is removed from the joint between the moulds as the latter become locked. The moulding pressure, in association with the preferably preheated mould, which is continuously heated during the moulding operation, brings about the hardening of the moulded article.

At the end of the hardening time—which is fixed by the clock in single part production and by plan control in large scale production—the moulding pressure cylinders 1 are switched off, the platen with the female mould slowly moves down by its own weight or by means of retracting cylinders provided with differential pistons 1′, and the hardened moulded article released from the mould. The locking elements are then loosened, the main head 5 with the male mould 4 is lifted and pivoted back in such manner that both moulds are independently accessible for the removal of the finished product, the cleaning and charging operations of the mould.

FIGS. 3–15 show additional details and variants which may be adopted.

FIG. 3 shows how the reinforcement 10 is inserted into the mould, as the main head 5 falls. This insertion is controlled in synchronism with the downward movement of the main head 5.

Like FIGS. 1 and 2, FIG. 3 shows that the pivotal axis 17 may be adjusted up and down in accordance with the height of the utilized mould. In this case the locking elements must also be variable. In FIG. 1, provision for adjustment of the forked eyebolts 9' or of the annular eyebolts 9", is made possible by means of the screw threads and nuts on the latter. Obviously, any other provision for adjustment may be provided.

In order to have the reinforcement 10, which preferably consists of glass fibre mats or webs 12, under tension until the beginning of the actual moulding operation—which is only possibly, if there is no direct contact with one of the two moulds—the mat or web 12 inserted into the press between rollers or drums 29 may be independently sustained and held, as shown in FIG. 4. The glass fibre mats or webs 12 may be taken off from bales 13 arranged at all free sides outside the press and may be continuously led to the press, as shown in FIGS. 5 and 6. Particular emphasis is made on the fact that this is not possible with conventional presses because of the columns and yokes. As can be seen from FIGS. 5 and 6, these webs may be led crosswise or at a slight angle one to each other.

As shown in FIG. 7, the platen 3—if the columns necessary in conventional presses or the ledges of the main head are absent—may be guided exactly in that the guiding elements are arranged independently of any parts of the main head 5, of the platen 3 and the stand 14 which are stressed. Extremely long guidances may thus be provided which are independent of the pressing stroke. They work much more precisely than the guiding elements of the known embodiments since—in construction—they are not connected with the elements that are stressed.

In the embodiment of FIG. 7, bushings 30 are arranged in the main head 5 and corresponding bolts 31 at the upper side of the platen 3. At the bottom side the platen 3 is also provided with bolts 16 which glide in bushings 15 of the stand 14. At the beginning of the moulding operation, the bolts 31 which do not obstruct when the mould is charged, are lifted and are engaged in the bushings 30 on the main head 5. As the platen 3 is horizontally lifted in the bushings 15 by the bolts 16, the bolts 31 also engage precisely into the bushings 31, when the platen 3 is lifted.

In order to counteract—especially in large presses—the considerable bearing stress, which is given by the weight of the pivoting element, the main head 5 is extended beyond the pivotal axis 17 as shown in FIGS. 8 and 9; between the main head 5 and the stand 14 in front of and behind the pivotal axis 17, piston cylinders 18 and 19 are provided which offset the bearing stress. In FIG. 8 these piston cylinders 18 and 19, which are hydraulic cylinders, are arranged above and below the plane of the stand 14; the cylinder 18 presses in the direction of the main head 5 and the cylinder 19 pushes towards the stand 14. In the embodiment of FIG. 9, cylinders 18 and 19, both press towards the main head 5, i.e. the cylinder 19 presses towards the extended portion of the main head. The cylinder 18 may alternatively be the cylinder 6 in FIG. 2 and the cylinder 19 may be replaced by a counterweight. The latter is variable so that it can be adapted to the varying weight of the female mould utilized; it may e.g. be a water ballast.

FIG. 10 is a schematic partial view of a press according to the invention, in which the arrangement of the numerous pressure cylinders and of the locking elements consisting of forked eyebolts 9' and of annular eyebolts 9" may be seen. It is particularly to be noted here that the platen 3 may be of a small size due to the numerous, relatively small hydraulic cylinders spread under the projected area and that there are no or only small bending forces.

The plurality of the regularly spread moulding pressure cylinders 1 has the advantage that the platen may be flexible in order to be precisely adapted to the bottom side of the mould, as is shown in FIG. 11 on an enlarged scale. This is impossible with conventional presses as the platen must be rigid for the transfer of force. Especially in the case of large female moulds 2, their bottom surface shows irregularities which may easily be overcome by the embodiment according to FIG. 11 without any bending forces.

With presses of conventional construction, a load diagram supplied by the producer must be taken into account, if small, unsymmetric or unequal moulds are utilized. Due to the plurality of moulding pressure cylinders 1 according to the invention, the hydraulic cylinders which may be switched off individually or in groups, need only be actuated in the number required. Thus, an unequal stress or a deformation of the moulding system is precluded. FIG. 12 is a schematic view of the full number and FIG. 13 is a schematic view of a part of the moulding pressure cylinders 1 at work, the female moulds being of different size.

As can be seen from FIG. 14, the main head 5 may also be pivoted in accordance with the direction of length of the mould. The different parts work as described in relation to the aforesaid embodiments.

FIG. 15 demonstrates an arrangement consisting of a platen 3 and two female moulds 2, 2', the platen being divided so that the left or the right half 3' may be lifted. The pedestal 28 is provided between the two halves of the platen in such manner that the main head 5 pivotable about the axis 17, which is suitable on both sides to receive the male mould 4, 4', may fall into one of the two female moulds 2, 2' supported by the platen 3, 3'. While one mould is thus occupied with the moulding operation, the other is at disposal for the removal or the cleaning and charging operations of the mould. Such a tandem arrangement may be realized in such manner that the platen is shifted and the main head orientated to one side is utilized.

It is important to emphasize that the configuration and the arrangement of the locking elements on both longitudinal sides of the press ensure an extremely exact positioning and in particular, that if they are forked eyebolts 9' and annular eyebolts 9", these locking elements engage into each other at correct time intervals.

It is convenient to provide a platform 22 (FIG. 1) at the longitudinal side of the press, which platform is vertically adjustable so that it can be adjusted to the plane of division of the two moulds in order easily to remove the moulded article. It is convenient to arrange a bucket conveyor 23 with injecting jets 11 (FIG. 4) for the liquid synthetic resin on said bucket conveyor 23. Said bucket conveyor 23 may be directly inserted between the two moulds; it is coupled in synchronism with the main head 5 and is moved or driven out shortly before it reaches its position parallel to the female mould 2.

Finally it is to be mentioned that the different moulding pressure cylinders 1 are preferably connected with each other by conduits 25 for pressure balance. Thus the moulding pressure is well adapted to the mould utilized.

What I claim is:

1. A molding press for the production of articles of large area from reinforced plastic material comprising a male mold, a female mold, a platen supporting the female mold in a generally horizontal position, said platen being mounted upon a plurality of short-stroke pressure cylinders which upon actuation will lift said platen and said female mold to apply pressure upon plastic material in the production of articles in the press, said male mold being carried upon a main head which is rotatable about an axis located outside said male mold, means for moving said main head about said axis from a first position removed from said female mold to a second position in which the male mold is substantially horizontal and spaced above said female mold and means for locking said main head and male mold in said second position while permitting said female mold to be forced toward the so locked male mold by actuation of said short-stroke pressure cylinders.

2. A press according to claim 1 wherein the male mold is connected with the piston of at least one cylinder arranged to permit the male mold to fall towards the female mold during the closure of the mold, the energy of said fall transmitting the agent contained in the cylinder to a reservoir.

3. A press according to claim 2 wherein the energy accumulated through the agent in the reservoir is used for the closure of locking elements which hold the two molds together during the molding operation.

4. A press according to claim 1 having means for inserting plastic material and reinforcement for the article to be molded into the cavity between the molds shortly before the closure of the two molds and brake means for retarding the closing movement of the molds which is controlled in synchronism with said insertion of material.

5. A press according to claim 4 having pivoting means for inserting plastics material and reinforcement between said molds.

6. A press according to claim 5 having means for holding said reinforcement consisting of glass fibers after insertion into the mold, between the two molds without any direct contact therewith and means for impregnating the reinforcement with said plastic material, said impregnating means moving out of position between the two molds before closing the press.

7. A press according to claim 1 wherein said main head is rotatable about an axis parallel to the plane of said platen.

8. A press according to claim 7 wherein the main head is extended beyond the pivotal axis and is provided with pressure means acting in opposed directions.

9. A press according to claim 8 wherein one of said pressure means acting in opposed directions is mounted above the plane of the main head and the other is mounted below said plane.

10. A press according to claim 1 wherein said locking means comprise annular eyebolts on the main head engaging in the closing position of the molds with forked eyebolts fixed on a stand supporting the platen.

11. A press according to claim 10 wherein the pressure cylinders acting on the platen and the locking means are arranged in planes running perpendicularly to the longitudinal axis of the mold.

12. A press according to claim 11 wherein the locking means are coupled in synchronism with the pivoting movement of the main head.

13. A press according to claim 1 wherein the platen consists of a flexible plate which is conformable to the surface of the female mold during the molding operation.

14. A press according to claim 1 wherein two female molds are fixedly arranged in tandem, the pivotal axis of the main head being located in a plane level with the platen and extending between the two female molds, the main head having a male mold on both its top and bottom sides, pivoting of the main head effecting registration of a male mold with one or other female mold.

References Cited

UNITED STATES PATENTS

| | | | |
|---|---|---|---|
| 1,343,176 | 6/1920 | Larsen | 25—130 |
| 1,826,945 | 10/1931 | McKay et al. | 18—19 |
| 1,867,972 | 7/1932 | Hubbert et al. | 18—19 |
| 1,983,757 | 12/1934 | Hick | 25—130 X |
| 2,103,951 | 12/1937 | Lewis. | |
| 2,832,995 | 5/1958 | McCaw | 25—130 X |
| 2,869,179 | 1/1959 | Van Hartesveldt | 25—130 X |
| 2,973,025 | 2/1961 | Baillie et al. | 18—16 X |
| 3,078,516 | 2/1963 | Trammell et al. | 18—19 X |
| 3,161,911 | 12/1964 | Mathews | 18—17 X |
| 3,162,898 | 12/1964 | Fike | 18—18 |
| 3,189,399 | 6/1965 | Jacobs et al. | 18—19 |
| 3,217,356 | 11/1965 | Stutsman | 18—39 X |
| 3,228,066 | 1/1966 | Rippstein | 18—19 |
| 3,287,486 | 11/1966 | Jurgeleit et al. | 18—42 X |
| 3,315,311 | 4/1967 | Fike | 18—18 |
| 3,328,845 | 7/1967 | Ludwig | 18—26 X |
| 3,388,203 | 6/1968 | Meininger et al. | |

J. HOWARD FLINT, JR., Primary Examiner

U.S. Cl. X.R.

18—17, 19, 26; 25—130